United States Patent

Scheer

[11] Patent Number: 5,836,727
[45] Date of Patent: Nov. 17, 1998

[54] TOOL HEAD, IN PARTICULAR A FACING-TOOL HEAD

[75] Inventor: Gerhard Scheer, Löchgau, Germany

[73] Assignee: Komet Praezisionswerkzeuge Robert Breuning GmbH, Besigheim, Germany

[21] Appl. No.: 596,355
[22] PCT Filed: Jul. 12, 1994
[86] PCT No.: PCT/EP94/02271
  § 371 Date: Mar. 8, 1996
  § 102(e) Date: Mar. 8, 1996
[87] PCT Pub. No.: WO95/07160
  PCT Pub. Date: Mar. 16, 1995

[30] Foreign Application Priority Data

Sep. 11, 1993 [DE] Germany ............... P 43 30 903.8
Jun. 21, 1994 [DE] Germany ............... P 44 21 583.5

[51] Int. Cl.[6] ..................................... B23B 3/26
[52] U.S. Cl. .......................... 408/158; 408/240; 82/113
[58] Field of Search ............................... 408/153, 158, 408/240, 239 R, 56, 61; 82/113

[56] References Cited

U.S. PATENT DOCUMENTS

| 3,856,427 | 12/1974 | Lovendahl | 408/239 R X |
| 4,508,475 | 4/1985 | Peuterbaugh | 408/153 |
| 5,120,167 | 6/1992 | Simpson | 408/153 X |
| 5,316,417 | 5/1994 | Romi | 408/158 X |
| 5,580,197 | 12/1996 | Rohm | 408/240 |

FOREIGN PATENT DOCUMENTS

| 1 099 308 | 2/1961 | Germany . |
| 74 09 979 | 3/1974 | Germany . |
| 26 08 930 | 9/1977 | Germany . |
| 77 20 194 | 12/1978 | Germany . |
| 3605850 | 8/1987 | Germany . |
| 3617540 | 11/1987 | Germany | 408/56 |
| 571 491 | 8/1945 | United Kingdom . |

Primary Examiner—Andrea L. Pitts
Assistant Examiner—Henry W. H. Tsai
Attorney, Agent, or Firm—Flynn, Thiel, Boutell & Tanis, P.C.

[57] ABSTRACT

The invention concerns a facing-tool head with a main body (10) which can be attached to a machine spindle, a work slide (14) which can be moved along the main body (10) essentially at right angles to the axis (12) of the spindle and which has a tool-holder with a fixing mechanism (26) to hold a tool in place, and a mechanism for adjusting the work slide (14). This adjustment mechanism includes a central, longitudinally movable adjusting rod (18) which passes through the hollow machine spindle (44) into the main body (10) and gearing means (20) which translate the longitudinal motion of the actuator rod into the transverse motion of the work slide (14). In order to ensure sufficient application of force between the adjusting rod (18) and the work slide (14), and hence suitable sliding characteristics and high adjustment precision, the invention proposes that the end of the adjusting rod (18) nearest the work slide is fitted with two off-center gear rods (20) mounted diametrically opposite each other in the main body (10) with their axes parallel to that of the main body, the gear rods having helical toothing (54) facing essentially in towards the interior of the main body and engaging with matching helical toothing (56) on the work slide (14) facing radially outwards.

31 Claims, 10 Drawing Sheets

Fig. 8

TOOL HEAD, IN PARTICULAR A FACING-TOOL HEAD

FIELD OF THE INVENTION

The invention relates to a tool head, in particular a facing or boring head, having a basic body which can be fastened on the spindle of a machine tool, having at least one working slide which can be displaced on the basic body essentially transversely with respect to the spindle axis and has at least one tool carrier with a clamping mechanism for clamping a cutting tool or a tool holder, having an adjustment mechanism which can be actuated from the machine and has an axially displaceable adjusting rod, which is received centrally in the basic body through the hollow spindle, and gear mechanisms which convert the axial movement of the adjusting rod into a transverse movement of the working slide.

BACKGROUND OF THE INVENTION

In the case of a known tool head of this type (DE-C-26 08 930), the tool head being designed as a facing head here, the adjustment mechanism has an adjusting rod which is arranged such that it can be displaced coaxially with respect to the spindle axis and has radially outwardly oriented oblique toothing arrangements arranged on two diametrically opposite sides, while in each case two radially inwardly oriented toothed strips, which are arranged symmetrically with respect to the adjusting rod and mesh with the oblique toothing arrangements of the adjusting rod, are provided on the working slide and on a compensation slide which serves as counterweight. In this arrangement, the teeth on the toothed strips of the working slide run in opposite directions to those of the toothed strips of the compensation slide. In order to actuate the adjusting rod, provision is made for a crossfeed device which is designed specifically for this purpose, can be actuated from the machine and is received centrally through the machine spindle. Since they are arranged in the vicinity of the axis, the oblique toothing arrangements have relatively small surface areas, which has an adverse effect both for the sliding behavior between the adjusting rod and the slide and for the adjustment accuracy.

SUMMARY OF THE INVENTION

Taking this as departure point, the object of the invention is to develop a tool head of the type specified in the introduction, which ensures a favorable application of force between the adjusting rod and the slide, and thus favorable sliding behavior and high adjustment accuracy.

In order to achieve this object, the following combination of features is proposed: a tool head, in particular facing or boring head, having a basic body which can be fastened on the machine spindle of a machine tool, having at least one working slide which can be displaced on the basic body essentially transversely with respect to the spindle axis and has at least one tool carrier with clamping mechanism for clamping a cutting tool or a tool holder, having an adjustment mechanism which can be actuated from the machine and has an axially displaceable adjusting rod, which is received centrally into the basic body through the hollow machine spindle, and gear mechanisms which convert the axial movement of the adjusting rod into the transverse movement of the working slide, the adjusting rod, at its end near the slide, supports two off-center gear rods which are located diametrically opposite one another, which are aligned in an axis-parallel manner, which are guided axially in the basic body and which have oblique toothing arrangements which are oriented essentially radially towards the basic-body interior and are in engagement with complementary, radially outwardly oriented oblique toothing arrangements of the at least one working slide, and the adjusting rod being of hollow design. Additional advantageous configurations and developments of the invention are also proposed.

The solution according to the invention is based on the idea that an off-center arrangement of the gear mechanisms can achieve a more favorable application of force with large-surface-area abutment and torque support, these features having a positive effect on the sliding behavior, the adjustment accuracy and the service life. In order to achieve this, the invention proposes that, at its end near the slide, the adjusting rod supports two off-center gear rods which are located diametrically opposite one another, are aligned in an axis-parallel manner, are guided axially in the basic body and have oblique toothing arrangements which are oriented essentially radially towards the basic-body interior and are in engagement with complementary, radially outwardly oriented oblique toothing arrangements of the at least one working slide.

In addition, the gear rods may be in engagement with the radially outwardly oriented oblique toothing arrangements of at least one compensation slide, which can be displaced in the opposite direction from the working slide. The mass of the working slide and of the compensation slide and the displacement paths thereof are coordinated with one another such that balancing is ensured in every slide position.

In order better to be able to absorb the torques which occur at the gear rods upon actuation of the slides, the gear rods are widened in the form of plates at least at their end near the slide, at least part of the oblique toothing arrangements being arranged on the radially inwardly oriented broad side of the gear-rod parts widened in the form of plates. It has proven particularly advantageous, from both design and functioning points of view, if the adjusting rod is provided with a hollow shank and a collar which extends radially at the basic-body end of the hollow shank and is received by an axial guide of the basic body, and if, on that side of the collar which is located opposite the hollow shank, the gear rods are fastened, preferably screwed, on the collar such that they are located diametrically opposite one another and extend in an axis-parallel manner.

It is, then, possible, on account of the off-center gear rods, for the adjusting rod to be of hollow design, with the result that an actuating rod which can be actuated from the machine and is received centrally through the adjusting rod may be provided in order to produce an operative connection with further functional elements in the tool head. For example, for complete machining of workpieces in a clamping arrangement, it is highly advantageous if use can also be made of facing heads in machining centers with automatic tool changing. Up until now, this has been prevented by the fact that the central region of the machine spindle was occupied by the crossfeed device for the tool, with the result that it was not possible to accommodate an additional actuating mechanism there.

Upon use of a hollow adjusting rod for the slide adjustment, it is, then, possible to provide an actuating rod which can be actuated from the machine, received centrally through the adjusting rod, can be coupled in a releasable manner to the clamping mechanism within the basic body and by means of which automatic tool changing, which can be initiated from the machine, can take place.

In accordance with a preferred configuration of the invention, at its end near the slide, which is received through the hollow adjusting rod, the actuating rod supports a preferably claw-like coupling element which can be coupled, preferably in a central position of the slide, to a complementary coupling element which is arranged near the slide and is connected to the clamping mechanism. In order to be able to advance the actuating rod axially and actuate it in the direction of rotation, tool changing being initiated in the process, the actuating rod, in the region of its end near the slide, which is received through the hollow adjusting rod, is guided axially in the coupling direction, and is rotationally mounted, in a guiding and bearing bushing, which is in alignment with the adjusting rod and is fixed to the basic body. For this purpose, the guiding and bearing bushing includes a rolling-contact bearing which is designed preferably as a needle bearing and is intended for the actuating rod. An axial cavity for receiving the coupling element of the actuating rod in the disengaged rest position may be provided between the guiding and bearing bushing, on the one hand, and the slide-side coupling element, on the other hand.

A further preferred configuration of the invention provides that the clamping mechanism has a rotary plate which is mounted in the slide in an axially non-displaceable manner about an axis parallel to the spindle axis, supports the coupling element near the slide, and the rotary movement of which can be converted, via a threaded drive, into a radial clamping movement of clamping members are received, within the tool carrier, by a hollow shank of the tool or of the tool holder. In order to be able to transmit, to the clamping members with low friction, the forces which act on the actuating rod, the rotary plate is expediently mounted in axial rolling-contact bearings within the working slide. As a further improvement in this respect, and in order to make the coupling operation easier, the rotary plate, on the side near the actuating rod, includes an axially central centering pin for the actuating rod and at least two eccentric coupling claws which extend in an axis-parallel manner.

A particularly reliable actuation of the clamping mechanism can be achieved when the rotary plate supports an axially extending threaded rod which is received by an internal thread of an axially displaceable clamping sleeve arranged radially within the clamping members, the clamping sleeve is received centrally through the tool carrier in a rotationally fixed manner and acts, by way of cone surfaces on its outer side, against inner wedge surfaces of the clamping members. Provided expediently as clamping members are a plurality of tong segments which are at an angular distance from one another in the circumferential direction, are aligned in an axis-parallel manner and are supported, by means of outer wedge surfaces which are aligned axially opposite one another, against corresponding inner cone surfaces of the hollow tool shank and of the working slide, the tool holder being clamped axially and radially in the tool carrier during the process. In this arrangement, the tool carrier may have a cylindrical, double-cylindrical or conical inner surface for receiving a hollow tool shank with a complementary outer surface.

In order to improve chip removal and cooling during the machining operation, it has proven expedient if a cooling lubricant is supplied directly to the cutting edge. In order to permit this, it is proposed, in accordance with an advantageous configuration of the invention, that there be provided, in the basic body, at least one cooling-lubricant duct which can be supplied with cooling lubricant via a spindle bore and opens, via a radially aligned, fluid-tight telescopic tube, into a slide duct which leads to the tool carrier and can be connected, via the latter, to a tool duct.

In order to keep the tool carrier clean and to remove any chips and particles of dirt which are present during a changing operation, it has proven advantageous if there is provided, in the basic body, a compressed-air duct which can be supplied with compressed air preferably via a spindle bore and, in the central position of the working slide, communicates with a blowing-air duct near the slide which opens into the interior of the tool carrier. Consequently, blown air, which keeps the tool carrier clean, can be discharged during both the clamping operation and the ejection operation.

In order to be able to displace various tools on the tool head independently of one another for a wide variety of machining tasks, it is proposed, according to a preferred configuration of the invention, that, in addition to the first working slide, a second working slide which can be displaced essentially transversely with respect to the spindle axis and has at least one tool carrier is arranged on the basic body, and that the actuating rod, which is guided axially within the basic body and is received through the hollow adjusting rod, can be coupled to the second working slide via second gear mechanisms which convert the axial movement of the actuating rod into a transverse movement of the second working slide. Although, in principle, the two slides can be displaced in any direction with respect to one another, it is expedient if the first and the second working slides can be displaced on the basic body parallel to one another.

Advantageously, the second gear mechanisms are formed by two oblique toothing arrangements which are oriented radially outwards on diametrically opposite sides of the actuating rod, in the vicinity of the end, and by two radially inwardly oriented toothed strips which are arranged on the second working slide symmetrically with respect to the actuating rod and mesh with the oblique toothing arrangements of the actuating rod.

The gear rods according to the invention, which are arranged off-center in the basic body, may also be in engagement, by way of their inwardly oriented oblique toothing arrangements, with in each case one of two working slides which can be displaced on the basic body parallel to one another and in opposite directions and are separated from one another transversely with respect to their displacement direction by a central passageway. In this arrangement, the adjusting rod may include a tool carrier which is axially accessible through the central passageway and is able to hold, for example, a machining tool or a quill. The tool carrier, for its part, may be provided with a clamping mechanism which is radially accessible, by means of a screwing tool, through a basic-body opening which can be closed preferably automatically in a fluid-tight manner. An adjusting rod is provided with a radial collar for off-center fastening of the gear rods, a radial duct which passes through the collar may additionally be provided for access to the clamping mechanism of the tool carrier. In the case of this configuration, the adjusting rod may also be designed as a hollow shank whose axial bore may have a displaceable actuating rod or rigidly mounted sealing rod, which is provided with a coolant bore, passing through it.

In order to improve the machining accuracy of the tool, it is advantageous, in particular, for precision machining if the gear rods and/or the slides are supported on the basic body, at least by their guide surfaces remote from the oblique toothing arrangements, via prestressed rolling-contact guides, and are thus guided with a low degree of friction and play. In order, in the event of greater tool loading, to also utilize the advantages of a sliding guide and to improve the damping behavior, it is proposed, according to a preferred configuration of the invention, that the gear rods and/or the slides are supported on the basic body, at least by their guide surfaces remote from the oblique toothing arrangements, via combined rolling-contact and sliding guides, the facing sliding-guide surfaces resting against one another only when predetermined transverse loading is exceeded and the rolling-contact guides are elastically deformed.

A further advantageous configuration of the invention provides that the working slide has a tool carrier with end face bracing, the axis of said tool carrier being aligned transversely with respect to the spindle axis, at a distance therefrom and the end face of said tool carrier being arranged parallel to a center plane, which contains the spindle axis, and at a distance therefrom, the end face expediently being aligned parallel to the displacement direction of the working slide. By means of this arrangement, it is possible to fit the tool carrier with a cutting tool such that the main cutting force which occurs at its cutting edge during facing and plunge-cutting is directed transversely with respect to the end face. This means that an optimum flux of force, and thus an optimum machining result, can be achieved.

In order to increase the machining accuracy, it is advantageous if the working slide and the basic body are fitted with a rule and a sensor for direct displacement measurement.

BRIEF DESCRIPTION OF THE DRAWINGS

The invention is explained in more detail hereinbelow with reference to the exemplary embodiments represented schematically in the drawing, in which:

FIGS. 7b, 7c, and 7d show different sections through the facing head along section lines B—B, C—C and D—D of FIG. 7a.

DETAILED DESCRIPTION

The facing heads represented in the drawing essentially comprise a basic body 10, in each case one working slide 14 and compensation slide 16, which can be displaced together in opposite directions in the basic body transversely with respect to the basic-body axis 12. The facing head further having an adjustment mechanism, which includes an adjusting rod 18 and two gear rods 20 and is intended for displacing the slides 14, 16, as well as at least one tool carrier 24 which is arranged on the working slide 14, received, on the end side, through a through-passage 22, which is designed as a slot, of the basic body 10 and has an integrated clamping mechanism 26 for a tool holder 28.

Figure 4:
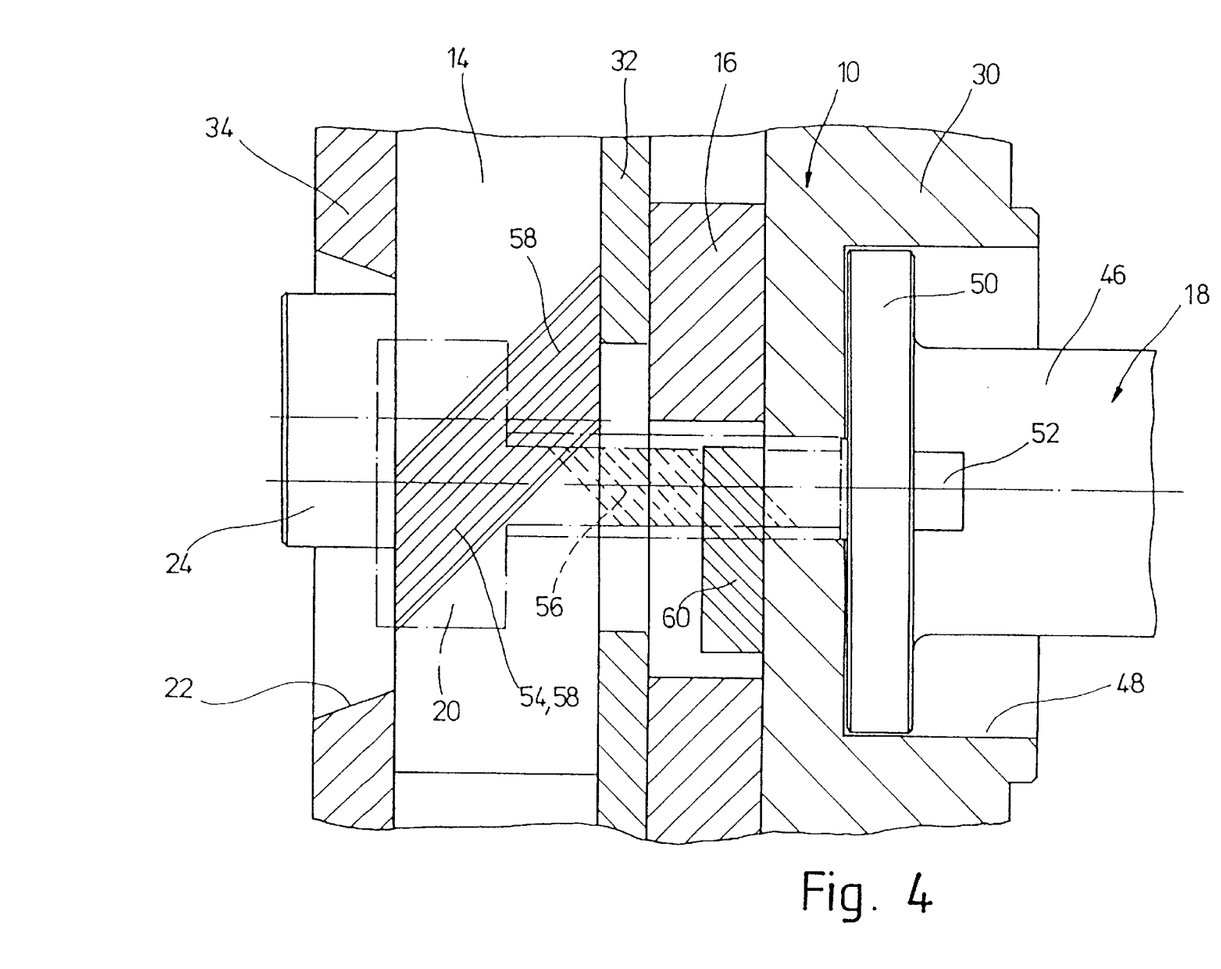
FIG. 4 shows a section along section line 4—4 of FIG. 3.
Figure 5:
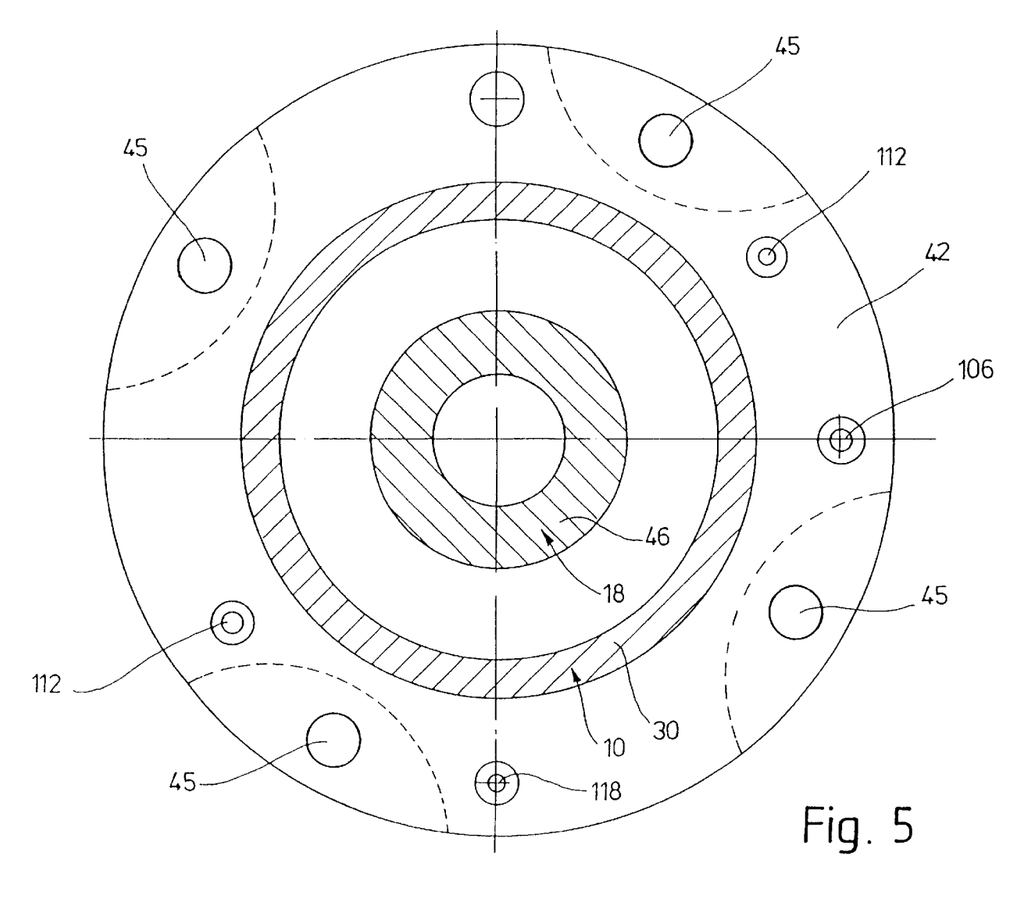
FIG. 5 shows a section along section line 5—5 of FIG. 1.

For assembly reasons, the basic body 10 is made up essentially of three parts: a housing part 30, an intermediate bearing 32 and a cover part 34 containing the through-passage 22, these three parts being connected rigidly to one another in the assembled state by means of screws 36, 38 and pins 40. On its housing part 30, the basic body 10 has a flange 42 for fastening on a machine spindle 44 by means of flange screws 45. The machine spindle 44 has a central cavity for the passage of the adjusting rod 18, which can be actuated from the machine. For this purpose, the adjusting rod 18, for its part, has a hollow shank 46, which is received by the spindle 44 in the direction of the machine tool, for connection to a feed member near the machine, and it also has a collar 50 which extends radially beyond the hollow shank 46 and is guided in a recess 48 which is opened toward the machine and belongs to the basic body 10. The eccentrically arranged, diametrically opposite gear rods 20 are fastened, by means of screws 52, on that side of the collar 50 which is located opposite the hollow shank 46, and they are guided axially in corresponding recesses of the basic body 10. As can be seen from FIG. 4, the gear rods 20 have an essentially T-shaped outline and support on their radially inwardly oriented broadened side surfaces, in each case, two oblique toothing arrangements 54, 56. The two oblique toothing arrangements are oriented towards opposite sides and mesh with complementary, radially outwardly oriented oblique toothing arrangements 58, 60 in the working slide 14 and in the compensation slide 16. This achieves a situation where, in the event of an axial adjustment (double arrow 18') of the adjusting rod 18, the working slide 14 and the compensation slide 16 are displaced in opposite directions (arrows 14', 16') within the basic body 10.

Figure 1:
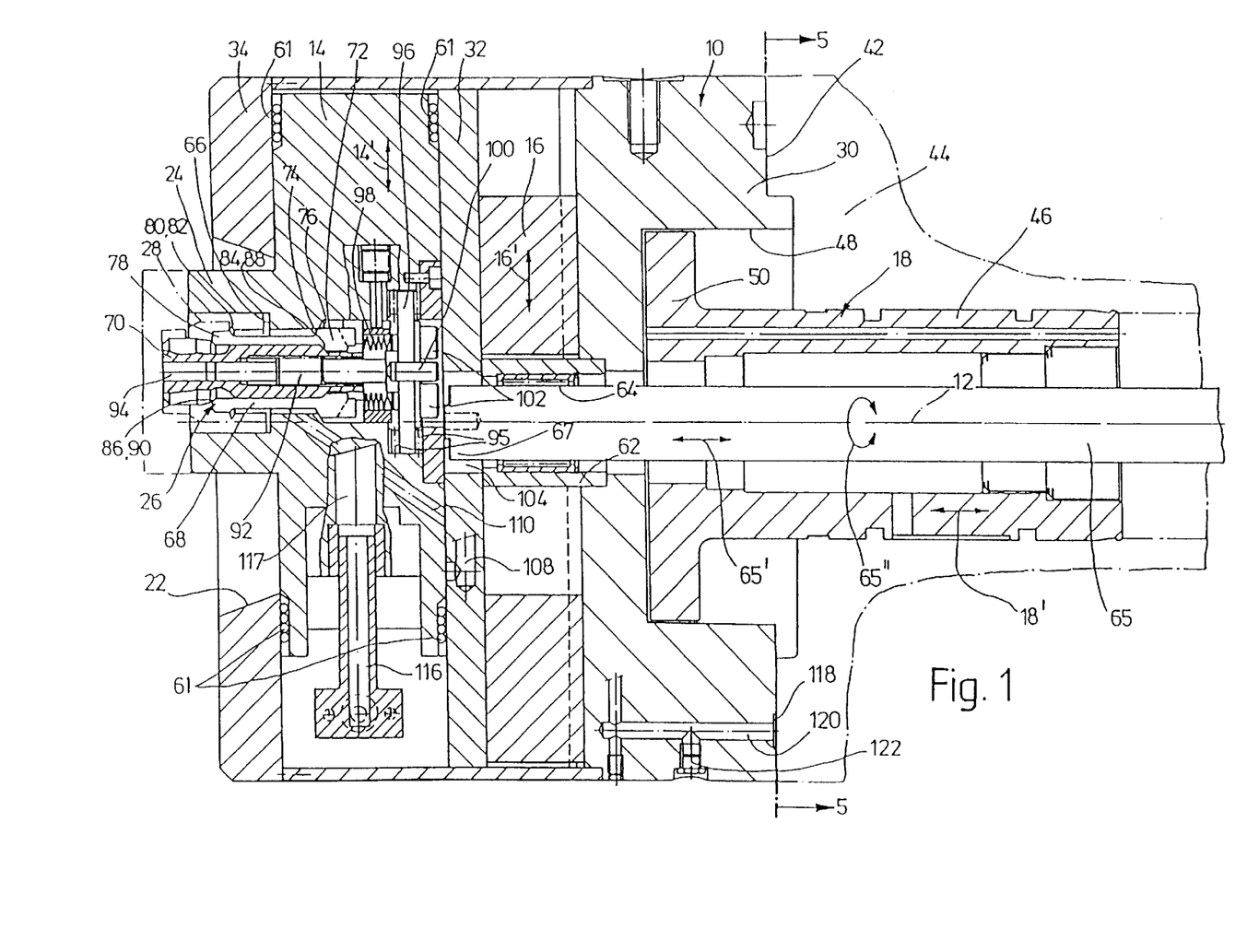
FIG. 1 shows a longitudinal section through a facing head with a slide which can be actuated from the machine and a tool carrier which can be actuated from the machine.
Figure 2:
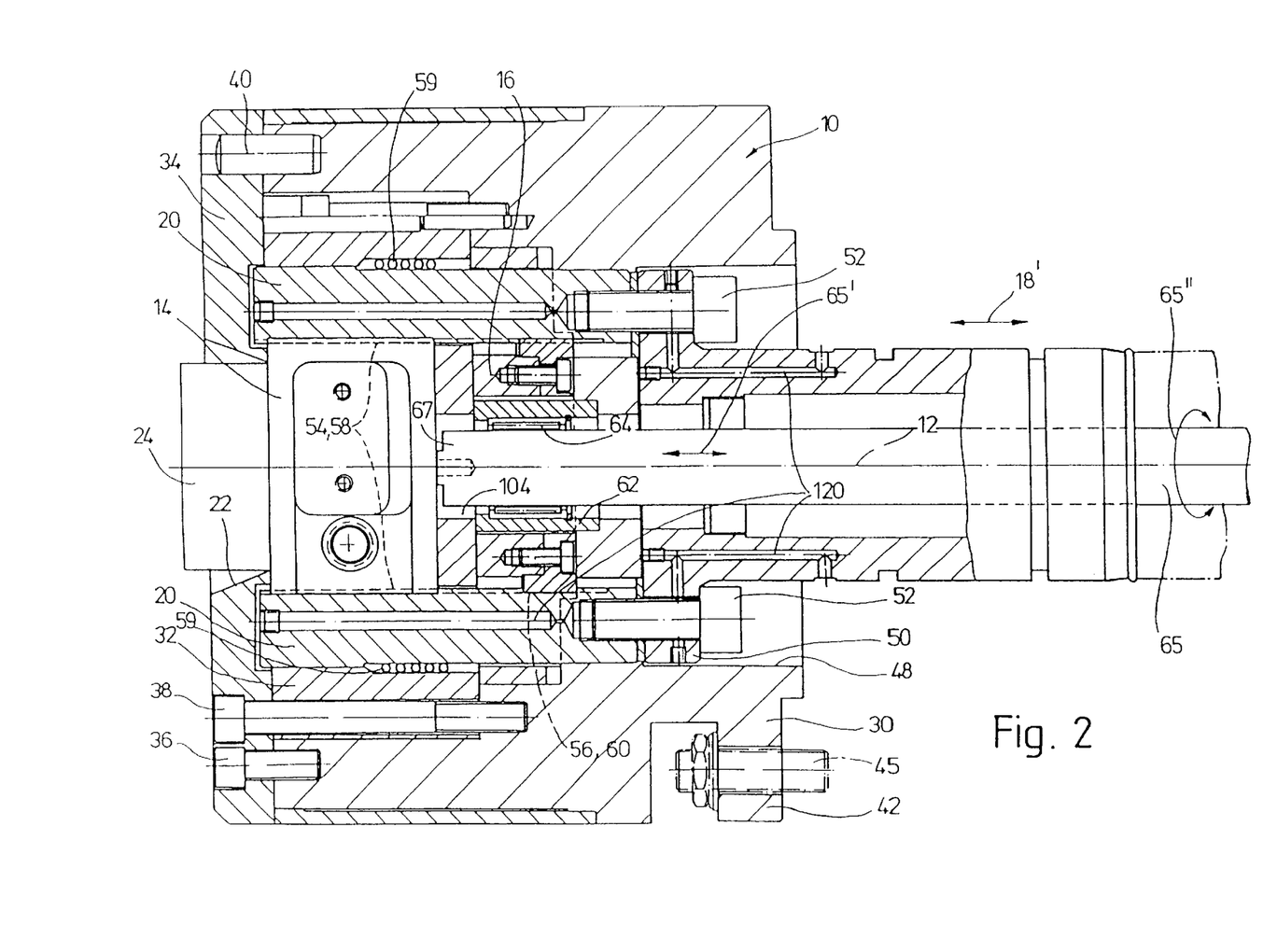
FIG. 2 shows a further longitudinal section through the facing head, this section being rotated through 90° with respect to FIG. 1.
Figure 3:
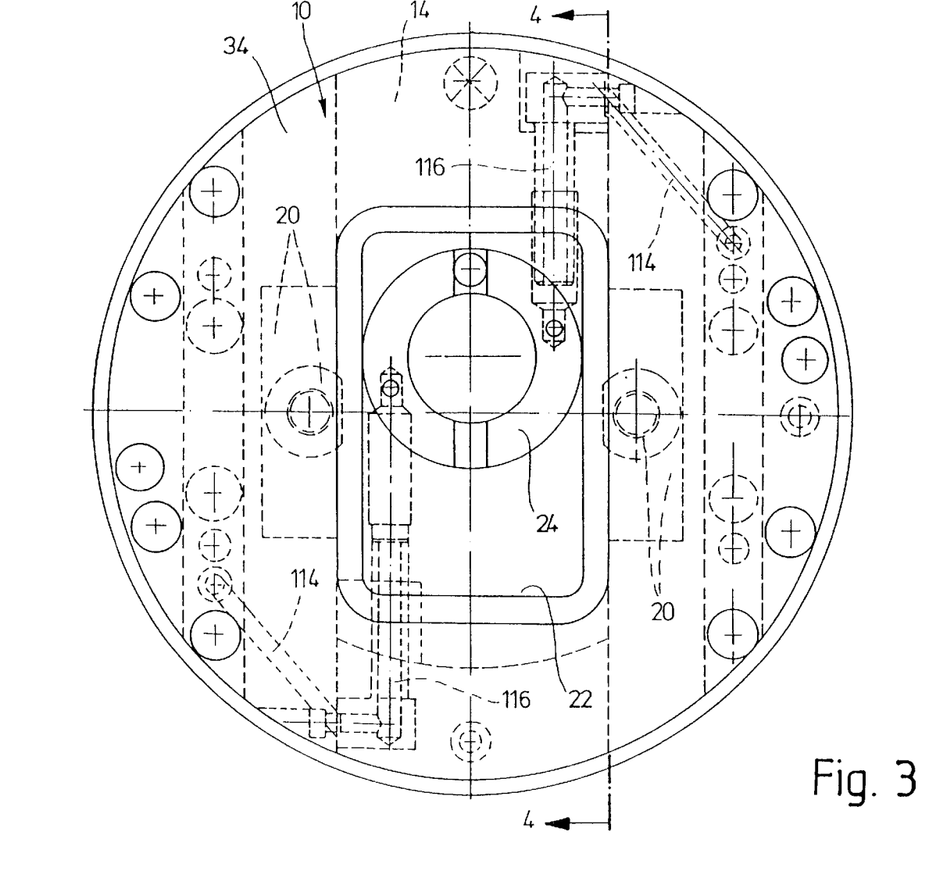
FIG. 3 shows a plan view of the facing head.
Figure 7A:
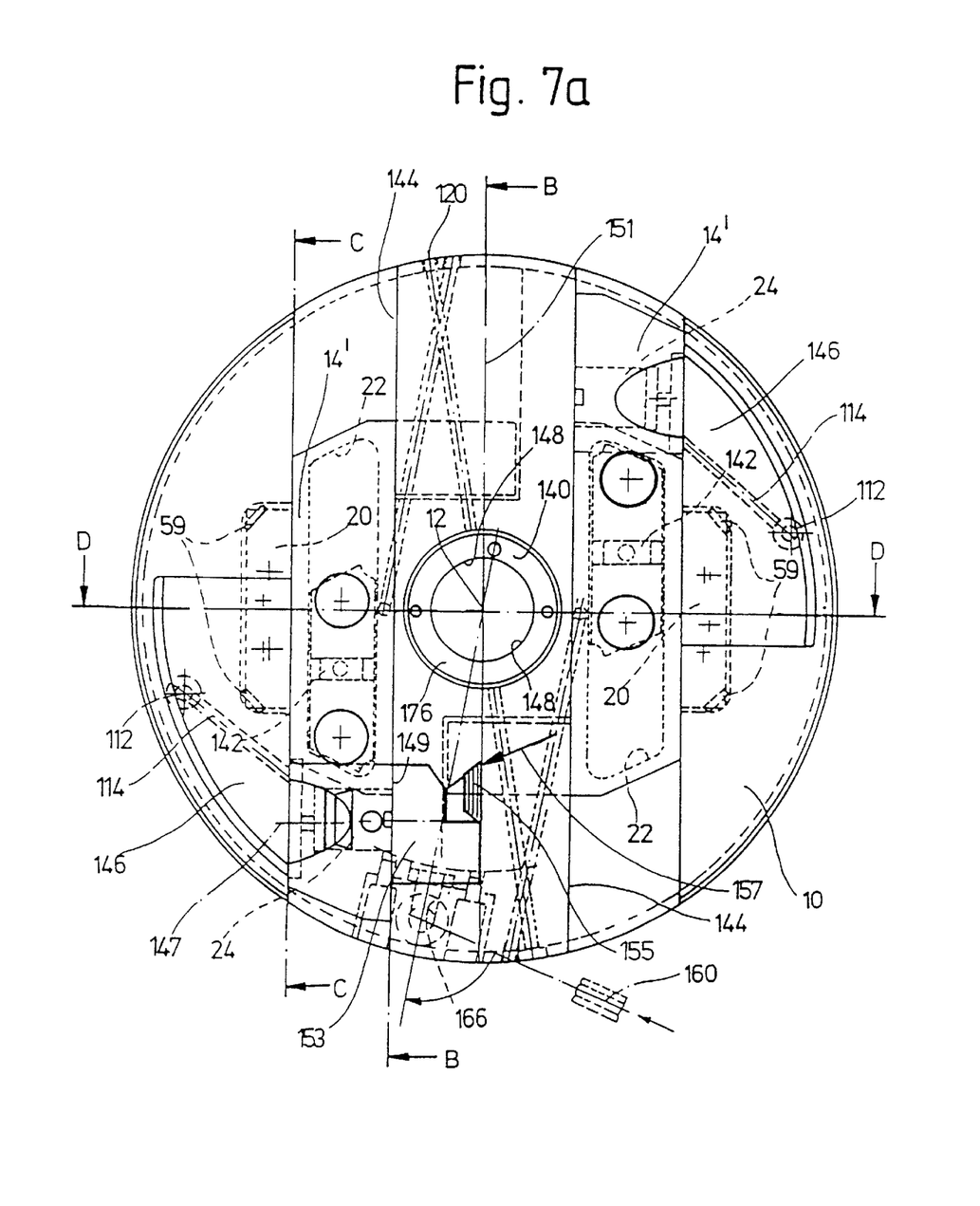
FIG. 7a shows a plan view of a further modified embodiment of a facing head with double slide and central passageway.
Figure 7B:
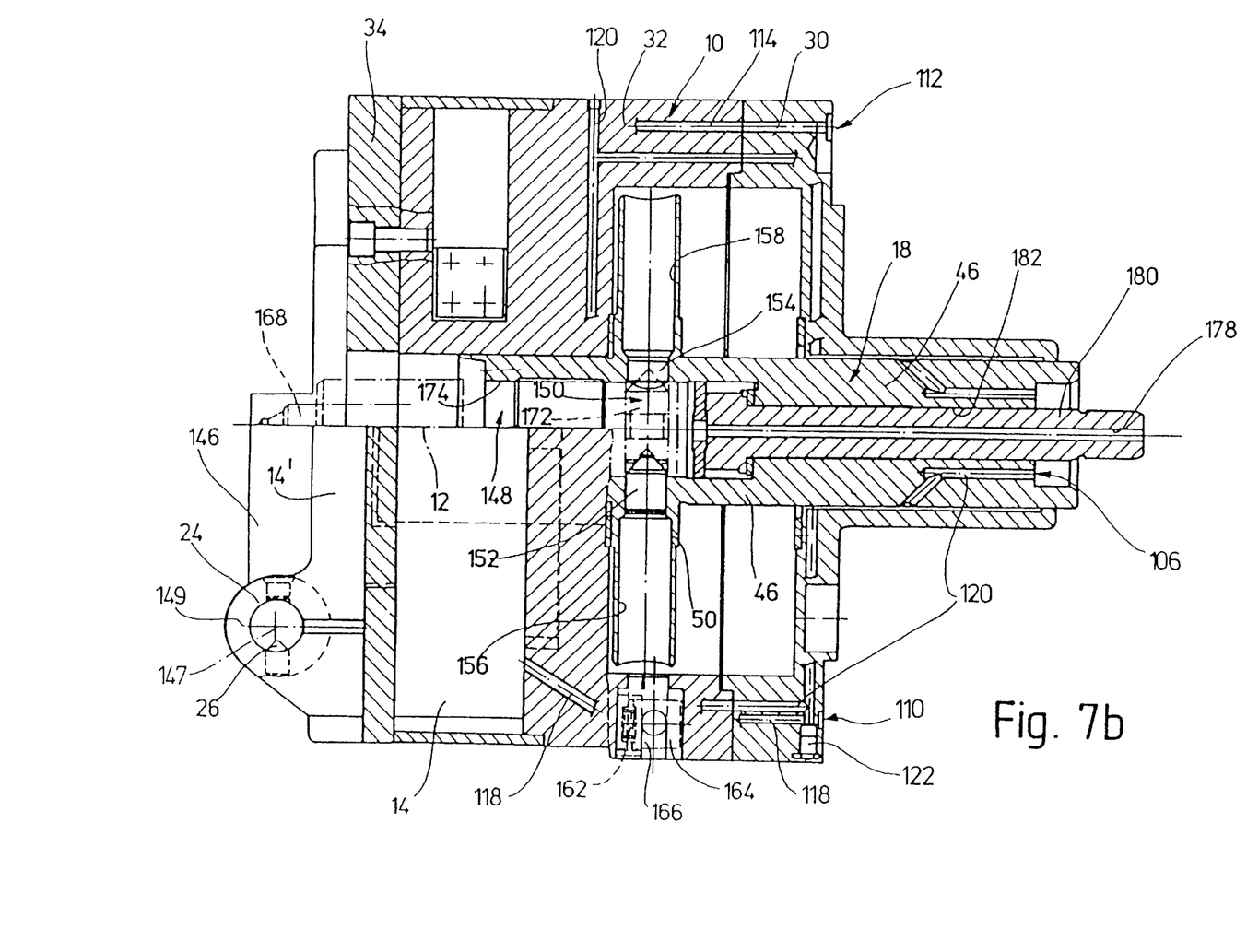

In order to improve the machining accuracy, in the case of the exemplary embodiments shown in FIGS. 1, 2 and 7a and d, the gear rods 20 and the working slides 14 are supported on the basic body 10, 32, 34, by their guide surfaces remote from the oblique toothing arrangements 58, 60, via rolling-contact guides 59, 61, 61', 61". Sliding guides may additionally be provided outside the rolling-contact guides 59, 61, 61', 61", the guide surfaces of which sliding guides still do not make contact in the case of a small amount of play of approximately 2 μm under light loading. If the rolling-contact guides 59, 61, 61', 61" are deformed slightly under loading, these sliding guides come into play. In this solution, the advantages of the rolling-contact guides and sliding guides are exploited equally and the damping behavior is improved.

Embedded in the basic body 10 at an axial distance from the adjusting rod 18 is a guiding and bearing bushing 62, which is coaxial with respect to the basic-body axis 12 and has a needle bearing 64 and is intended for guiding and supporting an actuating rod 65 which is received through the hollow adjusting rod 18 in the basic body from the end near the machine.

In the case of the exemplary embodiment shown in FIGS. 1 to 5, the actuating rod 65 is intended for actuating the clamping mechanism 26. The clamping mechanism 26, which is arranged in the working slide 14, includes, for this purpose, a plurality of tongue segments 68 which are at a distance apart from one another in the circumferential direction, are aligned in an axis-parallel manner and are received through the bottom 66 of the tool carrier 24, and the clamping mechanism also includes a clamping sleeve 70 which is arranged radially within the tongue segments 68. At one end 72, the tongue segments 68 each have a clamping surface 74 which is formed by a wedge-shaped or conical surface section and is supported on a conical clamping flank 76 of the working slide 14. At their other end 78, which is received by the tool carrier 24, the tongue segments 68 are provided with a clamping surface 80 which is formed by an oppositely directed conical surface section and can be pressed against a conical clamping flank 82 in the hollow tool shank 28. In order to clamp the tool, the tongue segments 68, with the hollow shank 28 introduced into the tool carrier 24, are moved radially outwards and are pushed onto the conical clamping flanks 76, 82 by means of their conical clamping surfaces 74, 80, the hollow shank 28 being braced axially and radially in the tool carrier 24 in the process. Actuation takes place with the aid of the clamping sleeve 70, the outer surface of which has two spaced-apart clamping cones 84, 86 which, in the event of an axial displacement of the clamping sleeve 70, run onto corresponding oblique surfaces 88, 90 of the tongue segments 68.

The displacement of the clamping sleeve 70 takes place with the aid of a threaded rod 92 which is received by an internal thread of the clamping sleeve 70 and can be actuated via a rotary plate 96 which is mounted in the working slide 14 such that it can be rotated, in roller bearings 95, about the axis 94 coaxially with respect to the clamping sleeve 70. Clamping takes place counter to the force of the restoring springs 98, which may also be designed as a cup spring assembly. The rotary plate 96 has a centering pin 100, which extends toward the side near the machine side, and coupling claws 102 to which the actuating rod 65 extending from the side near the machine can be coupled on its other end by axial advancement.

In order to be able to carry out the coupling, the working slide 14 first of all has to be displaced into its central position, in which the axis 94 of the tool carrier is in alignment with the basic-body axis 12. On the other hand, displacement of the working slide 14 is possible only if the actuating rod 65, with its other end coupling part 67, has been drawn back into the cavity 104 between working slide 14 and guiding and bearing bushing 62 (arrow 65'). The actual clamping operation during tool changing is effected by the coupled actuating rod 65 being rotated in one direction of rotation or the other (arrow 65").

In order to keep the tool carrier 24 clean and to remove any chips and particles of dirt present there, the tool carrier 24 is supplied with blowing air via a compressed-air connection from the side near the machine. The compressed air necessary for this purpose passes, via a flange connection 106, into a compressed-air duct 108 within the basic body 10, which compressed-air duct 108, in the central position of the working slide 14, communicates with a blowing-air duct 110 of the working slide 14 and opens into the tool carrier 24.

In order to supply the tool cutting edges with a cooling lubricant from the side near the machine, two cooling-lubricant connections 112 are provided in the flange, these being connected, via cooling-lubricant ducts 114 and telescopic tubes 116, to cooling-lubricant ducts 117 in the working slide and in the tool.

A further connection 118 in the flange 42 serves to supply the movable parts of the facing head with a viscous lubricant via the lubricant ducts 120, which may, if required, be additionally supplied with lubricant via a lubricating nipple 122.

Figure 6:
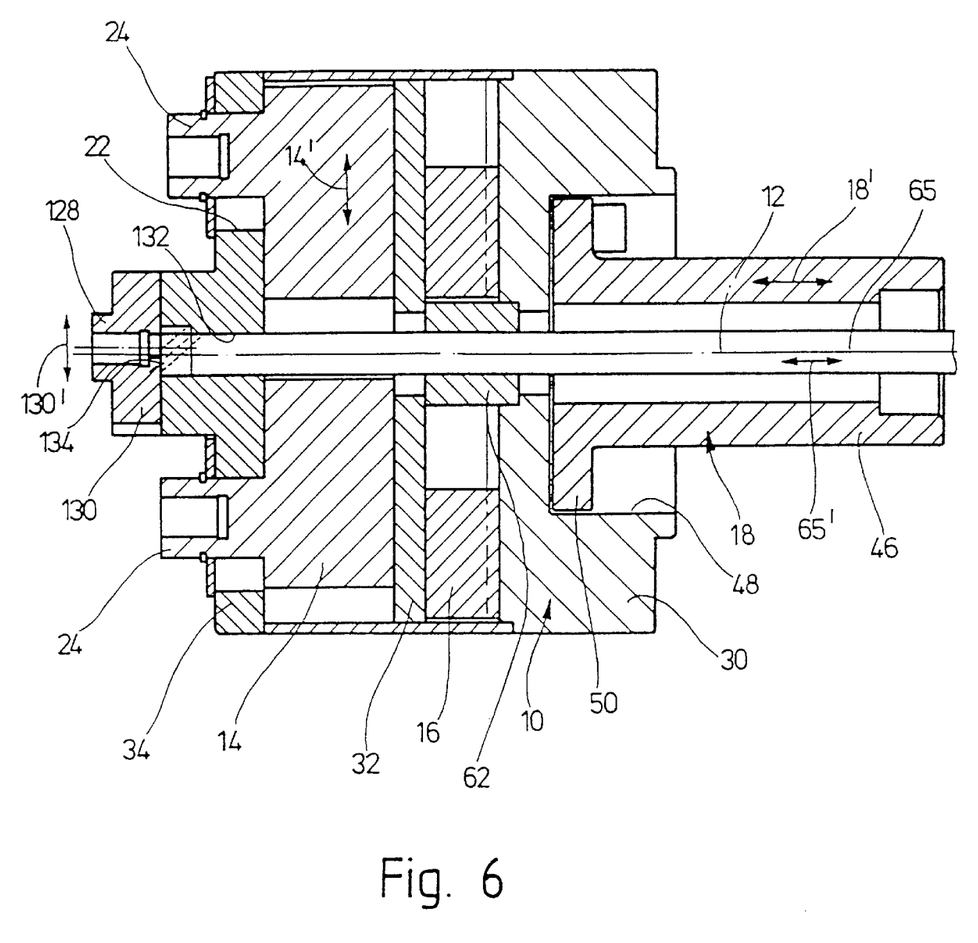
FIG. 6 shows a longitudinal section through a modified facing head with two working slides which can be actuated independently of one another from the machine.

In the case of the exemplary embodiment shown in FIG. 6, the working slide 14 has two eccentrically arranged tool carriers 24 which are received through the through-passages 22 in the cover part 34 of the basic body and contain an externally actuable clamping mechanism (not shown). Furthermore, a second working slide 130 which is provided with a tool carrier 128 is mounted on the cover part of the basic body such that it can be displaced, in the direction of the double arrow 130', transversely with respect to the basic-body axis 12. The working slide 130 is displaced via the actuating rod 65 which, at its end, is received through an axial guide 132 in the cover part 34 and bears diametrically opposed oblique toothing arrangements 134 which mesh with complementary oblique toothing arrangements (not shown) of the second working slide 130.

FIGS. 7a to d show a modified exemplary embodiment of a facing head with two working slides 14 which, via the adjusting rod 18, can be displaced together on the basic body 10 parallel to one another and in opposite directions. The two working slides 14 are arranged such that they are separated laterally from one another by an axial central passageway 140. They are received, by way of a sliding block 142, in the through-passage 22 in the cover part 34 and have, on the outside, a carrier support 14' with, in each case, one tool carrier 24. The carrier supports 14' are guided in the displacement direction in each case one guide channel 144 in the cover part 34 and are additionally supported, radially towards the outside, on a guide strip 146 fixed to the basic body.

As can be seen, in particular, from FIG. 7a, the axis 147 of the tool carrier 24 is aligned transversely with respect to the spindle axis 12, at a distance therefrom, while the end face 149 of said tool carrier is arranged parallel to a center plane 151, which contains the spindle axis 12, and at a distance therefrom. Consequently, the tool carrier 24 can be fitted with a cutting tool 153 such that the main cutting force (arrow 157) which occurs at the cutting edge 155 of the cutting tool 153 during facing and plunge-cutting is absorbed directly by the end face 149. This means that an optimum flux of force can be achieved.

The gear rods 20 screwed on the collar 50 of the adjusting rod 18 by means of screws 52 are in engagement, by means of their radially inwardly oriented oblique toothing arrangements 54, with in each case one of the working slides 14. A tool carrier 148, to which access can be gained from the end through the central passageway 140, with a clamping mechanism 150 designed as an ABS coupling is arranged in the hollow shank 46 of the adjusting rod 18 (ABS is a trademark of the company Komet Präzisionswerkzeuge Robert Breuning GmbH). The clamping screw 152 and the retaining screw 154 of the clamping mechanism 150 are accessible, by means of a screwing tool 160, through in each case one radial duct 156, 158 in the collar 50 of the adjusting rod 18. While the retaining screw 154 has to be permanently tightened in the dismantled state of the adjusting rod 18, the clamping screw 152 is accessible from the outside, by means of the screwing tool 160, even in the assembled state of the adjusting rod 18 through an opening 166 which is located in the wall of the basic body 10 and can be closed in a water-tight manner by means of a closure member 164 which can be adjusted automatically by a spring 162. The tool, which can be introduced into the tool carrier 150 and is designed, for example, as a quill 168, engages, by way of its cylinder shank 172 fitted with an oscillating-action pin 170, into the cylinder sleeve 174, integrally formed at the end of the adjusting rod 18, of the tool carrier 148 and, with the aid of the clamping mechanism 150, is tightened, by way of an annular surface, against the end face 176 of the cylinder sleeve 174 and braced therewith. The coolant is fed from the machine via a central coolant duct 178 in a sealing rod 180, which passes through the axial bore 182 of the hollow shank 46 of the adjusting rod 18 in a fluid-tight and non-displaceable manner.

In order to increase machining accuracy, it is advantageous if the working slide 14 and the basic body 10 are fitted with a rule 193 and a sensor 194 for direct displacement measurement.

Figures 7C, 7D:
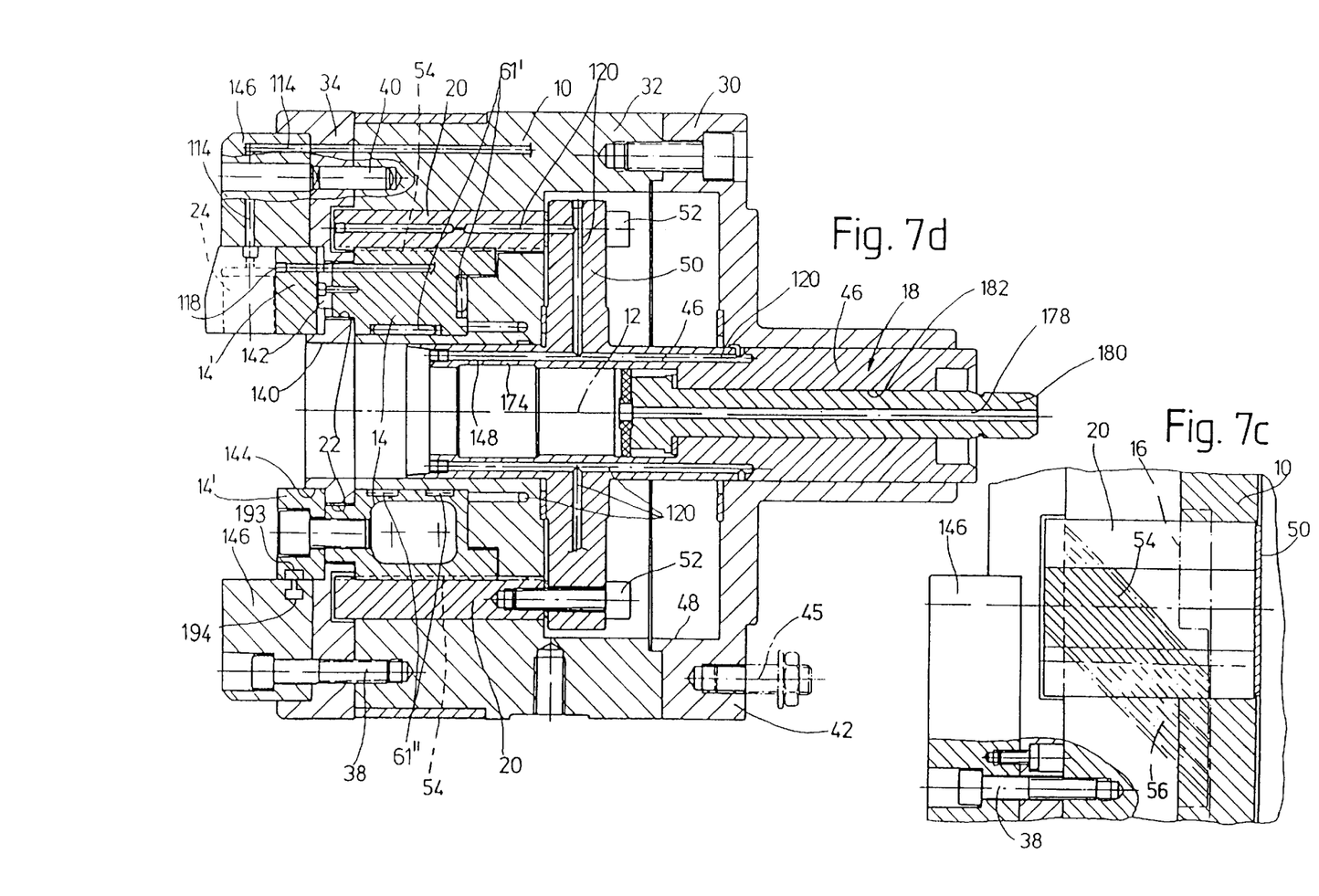
Figure 8:
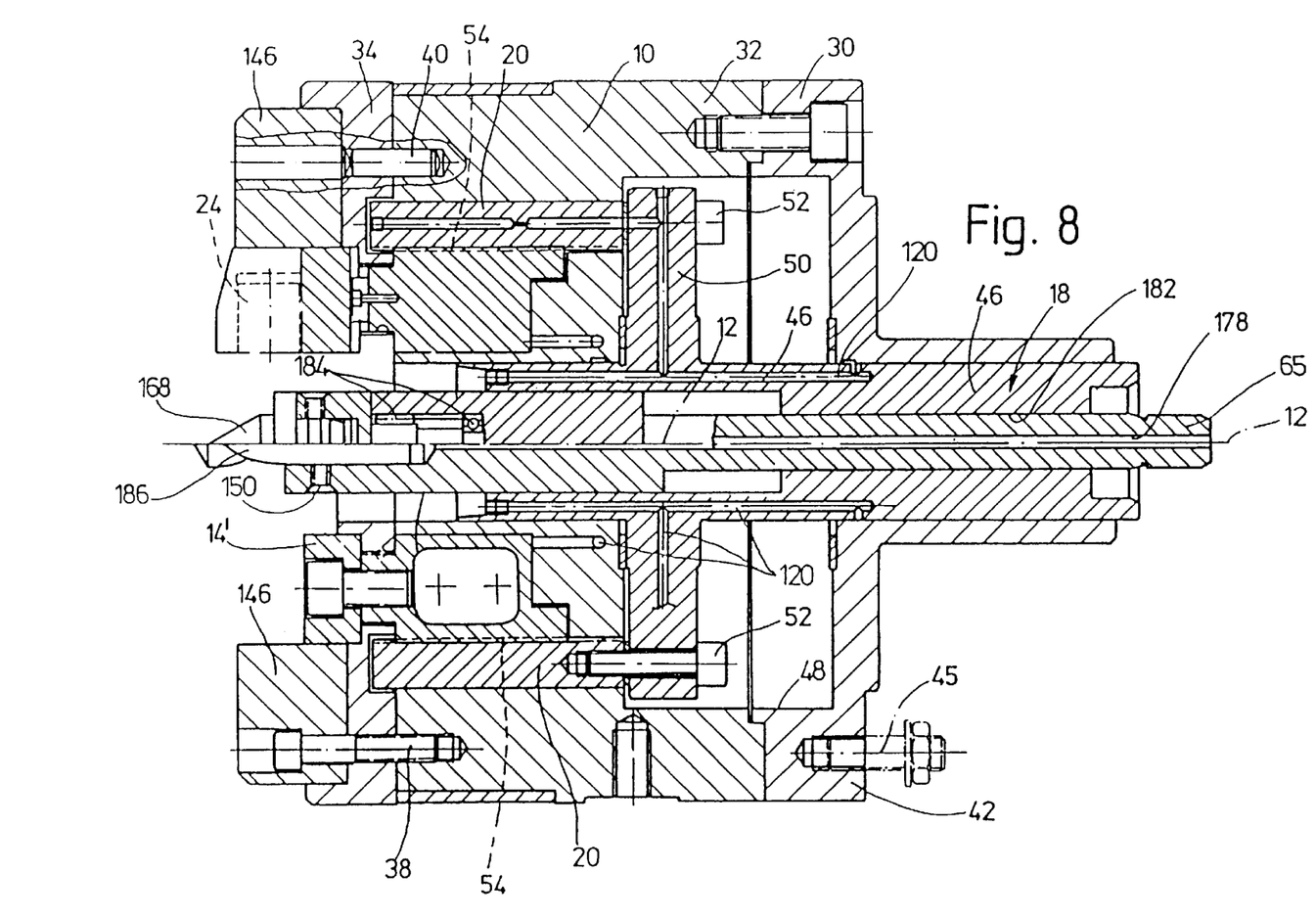
FIG. 8 shows a facing head with double slide, central passageway and central actuating rod with tool carrier in a representation corresponding to FIG. 7d.

The exemplary embodiment shown in FIG. 8 differs from the exemplary embodiment according to FIG. 7d in that the tool carrier 148 with the clamping mechanism 150, rather than being arranged on the adjusting rod 18, is arranged at the end of the actuating rod 65 arranged in a displaceable manner in the adjusting rod 18. Two variants for this are depicted in FIG. 8. Represented in the upper half of the actuating rod 65 is a tool carrier 148 which is mounted in a freely rotatable manner in a rolling-contact bearing 184, concentric with the spindle axis 12, and is fitted with a quill center 168. Represented in the lower part is a carrier 148 which is connected rigidly to the actuating rod 65 and in which a drill 186 is clamped.

To sum up, the following may be stated: The invention relates to a facing head which includes a basic body 10 which can be fastened on a machine spindle, a working slide 14 which can be displaced on the basic body 10 essentially transversely with respect to the spindle axis 12 and has a tool carrier 24 with clamping mechanism 26 for clamping a tool, and an adjustment mechanism for the working slide 14. The adjustment mechanism contains an axially displaceable adjusting rod 18, which is received centrally into the basic body 10 through the hollow machine spindle 44, and gear mechanisms 20 which convert the axial movement of the adjusting rod into the transverse movement of the working slide 14. In order to ensure a favorable application of force between the adjusting rod 18 and the slide 14, and thus favorable sliding behavior and high adjustment accuracy, the invention proposes that, at its end near the slide, the adjusting rod 18 supports two off-center gear rods 20 which are located diametrically opposite one another, are aligned in an axis-parallel manner, are guided axially in the basic body 10 and have oblique toothing arrangements 54 which are oriented essentially radially towards the basic-body interior and are in engagement with complementary, radially outwardly oriented oblique toothing arrangements 56 of the working slide 14.

I claim:

1. A tool head, comprising a body adapted to be fastened on a hollow machine spindle of a machine tool, the machine spindle defining a spindle axis, at least one working slide displaceably mounted on the body, the working slide being displaceable essentially transversely to the spindle axis and having oblique, radially outwardly oriented toothing arrangement and at least one tool carrier, the tool carrier having a clamping mechanism for clamping at least one of a cutting tool and a tool holder thereto, an adjustment mechanism which can be actuated from the machine tool having an axially displaceable, hollow adjusting rod and gear mechanisms the adjusting rod being received centrally in the body and extending through the machine spindle, the gear mechanism converting the axial movement of the adjusting rod into the transverse movement of the working slide, an end of the adjusting rod near the slide supporting two off-center gear rods, the gear rods being located diametrically opposite one another, being aligned in an axis-parallel manner, being guided axially in the body and having an oblique toothing arrangement, the toothing arrangement of the gear rods being oriented essentially radially towards the body interior and being engaged with the complementary toothing arrangement of the at least one working slide.

2. The tool head as claimed in claim 1, wherein at least one compensation slide is displaceably mounted on the body and has a radially outwardly oriented oblique toothing arrangement, and the gear rods are engaged with the toothing arrangement of at least one compensation slide, the at least one compensation slide is displaceable in an opposite direction of the displacement of the working slide.

3. The tool head as claimed in claim 1, wherein at least a slide-side end part of the gear rods is widened to form a plate.

4. The tool head as claimed in claim 3, wherein at least part of the oblique toothing arrangement is arranged on a radially inwardly oriented broadened side surface of the gear-rod end part widened in the form of plates.

5. The tool head as claimed in claim 1, wherein the body has an axial recess, the adjusting rod has a hollow shank and a collar which extends radially at the body end of the hollow shank and is received in the axial recess of the body, and the gear rods are fastened on a part of the collar opposite the hollow shank such that the gear rods are located diametrically opposite one another and extend in an axis-parallel manner.

6. The tool head as claimed in claim 1, wherein an actuating rod is received centrally through the hollow adjusting rod and is actuatable from the machine tool.

7. The tool head as claimed in claim 6, wherein the actuating rod is releasably coupled to the clamping mechanism in the body.

8. The tool head as claimed in claim 7, wherein an end of the actuating rod which is received through the hollow adjusting rod supports at least one coupling element, and a complementary slide-side coupling element is connected to the clamping mechanism, the coupling element and the complementary coupling element being coupled together.

9. The tool head as claimed in claim 6, wherein a guiding and bearing bushing is fixed to the body and is aligned with the adjusting rod, an end of the actuating rod extending beyond the hollow adjusting rod is guided axially in a coupling direction in the guiding and bearing bushing.

10. The tool head as claimed in claim 9, wherein the guiding and bearing bushing has a rolling-contact bearing which is a needle bearing and is adapted to rotationally mount the actuating rod.

11. The tool head as claimed in claim 9, wherein the actuating rod has a coupling element, a slide-side coupling element is connected to the clamping mechanism, and an axial cavity for receiving the coupling element of the actuating rod in a disengaged rest position is located between the guiding and bearing bushing and the slide-side coupling element.

12. The tool head as claimed in claim 8, wherein clamping members are received in the tool carrier, the clamping mechanism has a rotary plate axially fixedly mounted in the working slide about an axis parallel to the spindle axis, the rotary plate supports the slide-side coupling element, and gear mechanisms convert rotary movement of the rotary plate into a radial clamping movement of the clamping members into a hollow shank of one of a tool and a tool holder.

13. The tool head as claimed in claim 12, wherein the rotary plate is mounted in axial rolling-contact bearings within the working slide.

14. The tool head as claimed in claim 12, wherein the rotary plate has an axially central centering pin, and the slide-side coupling element has at least two eccentric coupling claws which extend in an axis-parallel manner.

15. The tool head as claimed in claim 12, wherein the clamping members have oblique inner surfaces, an axially displaceable clamping sleeve is positioned radially within the clamping members, an axially extending threaded rod is supported by the rotary plate and is received by an internal thread of the axially displaceable clamping sleeve and is received centrally through the tool carrier, and the clamping sleeve has clamping cones on an outer side thereof which act against the oblique inner surfaces of the clamping members.

16. The tool head as claimed in claim 15, wherein the hollow tool shank and working slide have conical clamping flanks, and wherein a plurality of tongue segments form the clamping members and are at a distance apart from one another in the circumferential direction, the plurality of tongue segments have at least one of wedge-shaped, outer clamping surfaces and conical, outer clamping surfaces and are aligned in an axis-parallel manner and are supported by means of the outer clamping surfaces against the corresponding conical clamping flanks of the hollow tool shank and the working slide such that one of a tool and tool holder is clamped axially and radially in the tool carrier.

17. The tool head as claimed in claim 1, wherein the tool carrier has a cylindrical surface and conical inner surfaces for respectively receiving a corresponding outer surface of a hollow tool shank and a tongue segment.

18. The tool head as claimed in claim 1, wherein a tool carrier duct is positioned in the tool carrier for receiving at least one of coolant and lubricant, at least one cooling-lubricant duct is positioned in the body, a spindle bore supplies at least one of coolant and lubricant to the cooling-lubricant duct, and a radially aligned, fluid-tight telescoping tube connects the cooling-lubricant duct and the tool carrier duct.

19. The tool head as claimed in claim 1, wherein a blowing-air duct is provided in the working slide, a compressed-air duct is positioned in the body and communicates with the blowing-air duct, a spindle bore supplies compressed air to the compressed air duct, whereby air is blown into the interior of the tool carrier.

20. The tool head as claimed in claim 6, wherein a second working slide is positioned on the body and is displaceable essentially transversely with respect to the spindle axis, and wherein a second gear mechanism couples the second working slide to the actuating rod, the second gear mechanism converts axial movement of the actuating rod into transverse movement of the second working slide.

21. The tool head as claimed in claim 20, wherein the second gear mechanism has two oblique toothing arrangements which are oriented radially outwards on diametrically opposite sides adjacent an end of the actuating rod and two radially inwardly oriented toothed strips arranged on the second working slide symmetrically with respect to the actuating rod, and the toothed strips mesh with the oblique toothing arrangements of the actuating rod.

22. The tool head as claimed in claim 20, wherein the first and the second working slides are displaced on the body parallel to one another.

23. The tool head as claimed in claim 1, wherein two working slides are provided in the body parallel to each other and are displaceable in opposite directions, a central passageway laterally separates the two working slides, and the gear rods are in engagement with one of two working slides.

24. The tool head as claimed in claim 23, wherein one of the adjusting rod and the actuating rod is guided in the central passageway and has a tool carrier which is axially accessible through the central passageway and is adapted for receiving one of a machining tool and a quill and which has a co-running center mounted coaxially with respect to the spindle axis and which supports workpieces.

25. The tool head as claimed in claim 24, wherein the tool carrier has a clamping mechanism which is radially accessible, the clamping mechanism has an opening which is fluid-tightly closeable and is adapted to receive a tool therein.

26. The tool head as claimed in claim 25, wherein the collar of the adjusting rod has at least one radial duct, and the clamping mechanism is accessible from outside by means of a tool through the at least one radial duct.

27. The tool head as claimed in claim 1, wherein one of an actuating rod and sealing rod passes centrally through the hollow adjusting rod.

28. The tool head as claimed in claim 1, wherein one of the gear rods and working slide has guide surfaces remote from the respective toothing arrangement, and prestressed rolling contact guides are provided on the body and support at least one of the gear rods and the working slide at least by the respective guide surface.

29. The tool head as claimed in claim 28, wherein one of the gear rods and working slide has guide surfaces remote from the respective toothing arrangement, and combined rolling-contact/sliding guides are provided on the body and support at least one of the gear rods and the working slide at least by the respective guide surfaces, the facing guide surfaces and rolling-contact/sliding guides rest against one another only when predetermined transverse loading is exceeded and the rolling-contact guides are elastically deformed.

30. The tool head as claimed in claim 1, wherein the working slide has a tool carrier with an end face for end-face bracing of a cutting tool, an axis of said tool carrier is aligned transversely with respect to the spindle axis at a distance therefrom, and the end face of said tool carrier is arranged parallel to a center plane which contains the spindle axis and at a distance therefrom.

31. The tool head as claimed in claim 1, wherein the working slide and the body respectively have a rule and a sensor for direct displacement-path measurement.

* * * * *